Sept. 26, 1933.　　　　M. MUTO　　　　1,928,316
CONDUIT COUPLING AND THE LIKE
Filed Nov. 13, 1929

Inventor
Michael Muto
by Mitchell, Chadwick Kent
Attorneys

Patented Sept. 26, 1933

1,928,316

UNITED STATES PATENT OFFICE 1,928,316

CONDUIT COUPLING AND THE LIKE

Michele Muto, Boston, Mass.

Application November 13, 1929
Serial No. 406,962

8 Claims. (Cl. 285—194)

This invention relates to improvements in conduit couplings and the like. More particularly it relates to split couplings of the general type which embody two semi-cylindrical sections which are separable, and which are adapted to be clamped together upon two pieces of conduit, pipe, etc., which it is desired to connect together, end to end. The invention provides against entry of water or other substance to the interior of the coupling, and includes special interlocking features between the coupling sections, for installing the coupling.

Couplings of the general sort to which the invention relates have proven to be deficient in certain important respects. Principal among these is their universal failure, so far as I have knowledge, to prevent entrance of liquids or gases to the interior of the coupling with consequent deterioration of packing material or of the coupled elements by destructive effects of corrosion.

Another, manifest more especially in couplings of the hinge type, is the danger of the packing or lining of the coupling becoming pinched in the hinge crack so as to prevent closure of the sections to the degree of tightness which is necessary to effect a tight clamping of pipe sections.

The invention has among its objects the provision of improvement in these respects, and also to improve upon and simplify the packing or lining of such couplings; and another important feature is that whereby the tightening of my improved clamp brings into play a cam action and a tendency to increase the tightness at the cleavages between sections, rather than a tendency to spread them apart as in the prior art split-coupling structures.

These objects and results may be attained with two mating, semi-cylindrical coupling members which have a separable hinge connection together along one side, and have clamping means along the other side, for drawing the sections close around the pipes or conduits which are to be coupled. The hinge connection involves a bead-in-groove structure wherein the bearing surface of the groove approaches semi-cylindricality, and is substantially tangent to the circle of the interior arcuate surfaces of the coupling members; and wherein the bead is removably maintained by leverage lugs which engage in slots on the grooved coupling members. The two members may be opened and closed for clamping pipes, etc. without any objectionable crack between the pipe-clamping or coupling-clamping surfaces, adjacent to the hinge. Consequently the pipes to be coupled may be preliminarily covered by being wrapped with a sheet of soft lead, for packing or lining, without the lead becoming pinched in the hinge as the hinge is closed.

The jointure diametrically opposite the hinge may have any suitable securing means by which the coupling halves may be tightened and clamped on the pipes. And, adjacent to the said means, a longitudinally extending projection on one member engages a cam surface on the other member ensuring tightness there at the crack. Also this cam action applies a diametrical force with the result that the hinge bead is urged toward the rear bottom of the hinge groove to effect a moisture-proof tightness there. Meanwhile the hinge lugs-in-slots device maintains the coupling members against spreading at the hinge as the clamping proceeds.

It is a feature that each coupling member has a portion of its main body, toward the hinge, whereat the member is less stiff than at other portions. This permits a slight springing of the respective members during the clamping so that their interior surfaces may conform to the contour of the coupled elements, the wrapped soft lead at the same time becoming compressed and reshaped to fill all available space and to seal effectively the side cleavages and ends of the coupling. Also the coupling members themselves provide tight joints to prevent substances in surrounding earth or air from entering and attacking the lead packing.

It is intended that the patent shall cover, by suitable expression in the appended claims, whatever features of patentable novelty exist in the invention disclosed.

Figure 1:
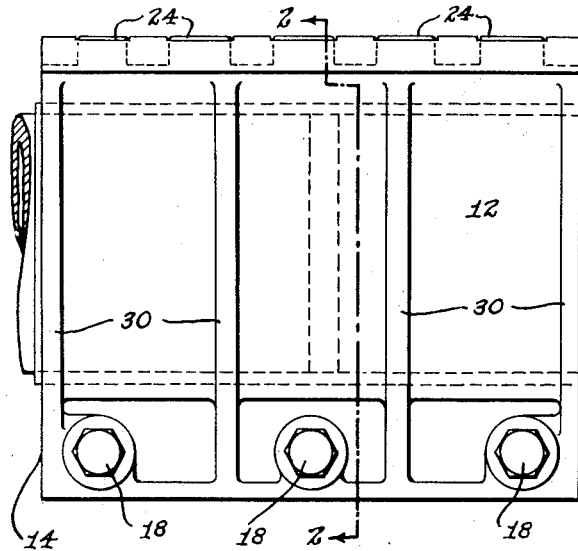
Figure 1 is a plan of my improved coupling shown clamped upon two sections of pipe.
Figure 2:
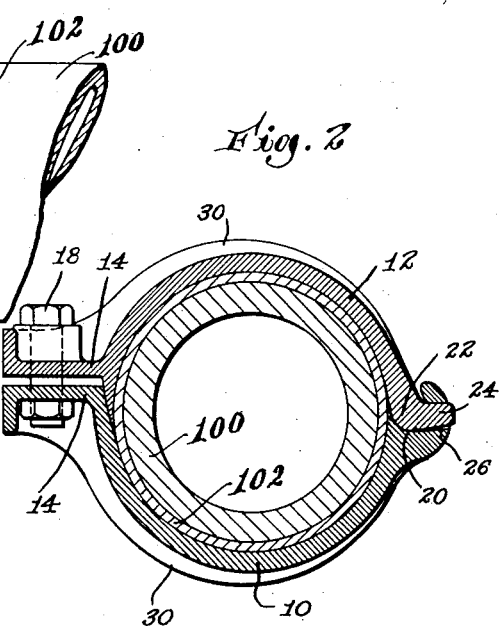
Figure 2 is an elevation, in section on 2—2 of Figure 1.
Figure 3:
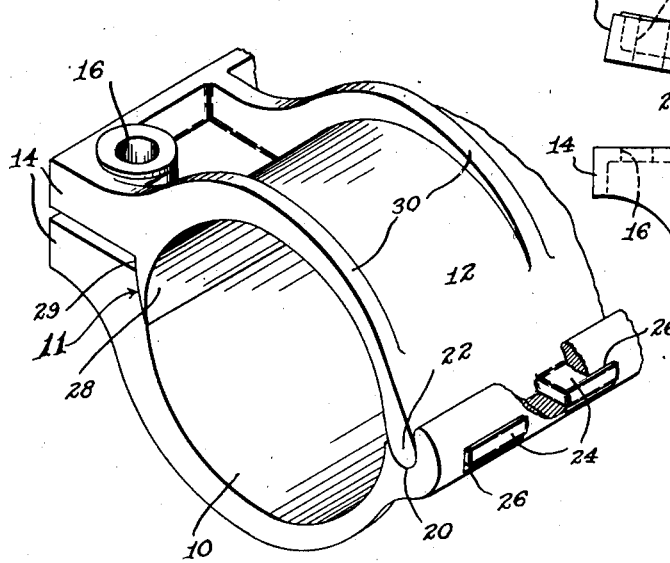
Figure 3 is a perspective of one end portion of the coupling, with a portion at the hinge broken away.
Figure 4:
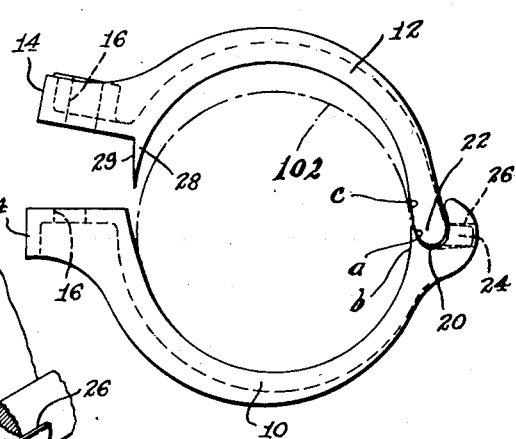
Figure 4 is an end elevation showing the coupling members partially spread open about the hinge.

Referring to the drawing, two coupling members 10, 12, which may be of cast metal, are separably hinged together along one side, and are adapted to be clamped together along the other side.

Each coupling member 10, 12 is semi-cylindrical in form, and each has a laterally extending flange 14 along its clamping side provided with registering holes 16, for reception of the clamping bolts 18. At the diametrically opposite side of the coupling, the edge of the wall of member 10 is grooved longitudinally as at 20; and the edge of the wall of member 12 is a longitudinally extending bead 22 which seats in the groove 20. A series of lugs 24, laterally projecting from bead 22 approximately in the plane of the said diameter, engages each in one of a series of slots 26 in the outer side wall of groove 20, thereby to effect a separable connection between the members 10, 12 at the hinge. And this lugs-in-slots device holds the members 10, 12 against spreading apart at the hinge when a pipe 100 or the like is clamped in the coupling.

It is a feature of the invention that my improved coupling may be tight against entrance of moisture or other substance which might deleteriously affect the joint within the coupling. To this end, the groove 20 is curvicular in cross-section, with its curved wall *a* which is toward the axis of the coupling running into the circle of curvature *b* of the inner face of the coupling member 10, at an angle which is in the neighborhood of being tangential, so that the upper portion *c* of the inner coupling face can swing open and closed, i. e. from continuity with the lower portion *b* thereof and back again into continuity therewith, by slipping around on surface *a* of the groove without opening a gap between *b* and *c*. The bead 22 fits nicely in the groove and has its surface which is toward the axis of the coupling merging smoothly into the circle of curvature *c* of the coupling member 12. Thus formed and assembled, the members 10, 12 may be opened about the hinge without opening a gaping crack at the hinge, as has resulted in previous structures of this sort. This feature is important where a bushing or packing of soft material 102 surrounds the coupled pipes and is to be closely engaged and clamped therewith, since the lips of an open crack pressing closely against such a lining material would constitute jaws to dig into the material as they are drawn together, and to pinch some of it in the crack, which pinched material then would prevent a complete closing of the crack, so that the members would not be drawn to the required tightness of clamping the pipe or other object.

The lugs-in-slots-device, heretofore referred to, also plays an important part in the accomplishment of the tight seal at the hinge. As the tightening of clamps 18 on members 10, 12 proceeds, with those members having a compressive bearing on the top and bottom of the enclosed matter 100, 102, the tendency would be for the hinge elements to spread apart, moving about the top and bottom respectively of the enclosed pipe as fulcrums; and so a crack would form as the surfaces of groove 10 and the bead 12 separate from each other. However, the outside lugs 24, engaging against the upper walls of their slots 26, prevent any appreciable spreading. They do, in fact, become outside fulcrums from whose immovability it results that, with further tightening of the clamps, 18, the soft material, 102 becomes compressed and tightly enclosed; and any incipient crack between groove 20 and bead 22 becomes closed. The bead 22 becomes pressed the more tightly into the groove and against its walls as the clamping progresses. The interengaging cam surfaces at 29 on the clamp side of the coupling contribute to this result. A projecting lip 28 on semi-cylindrical member 12 has its inner surface a cylindrical, pipe-fitting, continuation of the interior face of said member, and has exteriorly a cam face 29 which is adapted to engage a complementary cam surface 11, to which the elsewhere-cylindrical interior face of member 10 is here cut away. The lip 28 extends the full length of the coupling and constitutes a lap across the cleavage of coupling members 10, 12, to accomplish tightness here. But its cam action, incident to the drawing of the members 10, 12, together by clamps 18, tends to displace the lip 28 and the adjacent part of member 12 relative to the member 10 along the diametrical plane of cleavage; and this makes a lateral compression, which, plus the effect of the lugs-in-slots device at the hinge can produce a tight pressure of bead against groove at the lower rear portion of groove 10; and there is also obviously tight pressure of the lip 28 along the cam surface 11 at the clamp side.

Due to the novel hinge structure hereinbefore described, a novel type of packing or lining may be employed with my coupling. Soft lead 102 in sheet form may be wrapped around the pipe or pipes 100 to be clamped in the coupling, and can be molded by pressure of the coupling members so as to fill all available space between the pipes and said members. This type of lining applied in such a simple manner, can be effective because of the improvement at the hinge crack which, in an ordinary coupling, would have jaws that would pinch the lead, but which, is illustrated, has a tangential juncture between groove surface and lead compressing surface, which slide, as the hinge opens or closes without a crack being opened into which the lead might be squeezed.

The invention involves a further feature which permits my coupling to be, to a certain extent, self-conforming. Each member 10, 12, has stiffening ribs 30 extending in diminishing size from the clamp edge, but has a portion adjacent to the hinge which, due to absence of those ribs, is more bendable and resilient than said other portions. Each thus may, in the clamping, change its shape to an extent to accommodate the contour or size of the enclosed object.

Although herein spoken of as a coupling, especially for two pipes end to end, the tightness with which the appliance, including the soft lead wrapping, can be put around a pipe makes it available to cover a hole which may have occurred in the midst of a pipe length, without the expense of relaying the whole of that length of pipe or conduit, which may be serious when wires or smaller pipes lie within.

Having described one embodiment of the invention, without limiting the same thereto, that which I claim as new, and desire to secure by Letters Patent, is:

1. In a split cylindrical coupling, a separable hinge joint for the coupling members, comprising a bearing bead on the joint edge of one said member with a lug projecting therefrom; a bearing seat on the cooperating joint-edge of the other said member adapted to receive the said bead, and having a slot in its wall for reception of said lug; the wall of said seat and the complementary surface of said bead being curved on an arc which is substantially tangential to the curvature of the interior cylindrical surface of the coupling members.

2. In a split cylindrical coupling, a separable hinge joint for the coupling members, comprising a bearing bead on the joint edge of one said member having a curved bearing surface substantially tangential to the interior surface of its coupling member, and having a lug projecting outward from the bead; a bearing seat on the co-operating joint-edge of the other said member having a curved bearing wall substantially tangential to the interior surface of its coupling member, and complementary to the said curved bearing surface of the bead; said bead fitting in the said seat, and said seat having a slot in its wall into which the lug of the bead projects.

3. In a split cylindrical coupling adapted to be clamped around a lead-wrapped tube, a separable hinge joint for the coupling members adapted to maintain a substantially smooth and uninterrupted interior coupling surface at said hinge during the applying of the coupling; said hinge joint comprising a bearing bead on one said member curved tangentially from the latter's interior cylindrically curved surface, and a bearing seat in the other said member, with bearing wall curved tangentially with respect to that member's interior cylindrically curved surface, and complementary to said curve of the bead; said bead having a bearing in said seat, and there being a slot in a wall of the seat, and a lug on the bead engaging in said slot, interlocking the coupling members.

4. In a split cylindrical coupling, a separable hinge joint for the coupling members at one side of the cylinder, extending substantially the full length of the body of the coupling; securing means at the other side of the cylinder, for clamping said members about a pipe; and means at the latter said side, additional to said securing means, for ensuring tight interengagement between the members; said means comprising, on the edge of one member, a lip extending along said edge, projecting as a continuation of the interior surface of said member in the circular direction, and, on the other member, a receding cam surface constituting a seat for the exterior surface of said lip and extending substantially the full length of the body of the coupling; whereby the interior of the coupling continues closed in circular formation as the coupling members are tightened upon a pipe.

5. A split cylindrical coupling having its two coupling members separably hinged together at one side of the cylinder, and having means at the other side of the cylinder for clamping said members about a pipe; each of said members having a gradual reduction in thicknesses of its wall, progressive in the direction from said clamping means toward said hinge, whereby the portions of wall more remote from the clamp are the portions to bend under stress of the clamp, thereby promoting intimacy of embrace by the coupling.

6. In a split cylindrical coupling adapted to be clamped about a pipe, the combination of a sheet of soft lead wrapped around the pipe, and a pair of coupling members, each having substantially a smooth interior surface extending the whole length of the body for smoothly compressing the lead and said pair having a hinge joint together at one side of the pipe and its said wrapping and having securing means at the other side thereof for the clamping of said members upon the lead wrapping; and means at the latter said side, additional to said securing means, for ensuring a tight inter-engagement between the members; said additional means comprising on the one member a projecting lip, continuing the interior surface of that member, and, on the other member, a cam seat for receiving said lip whereby the applying of said securing means makes progressive tightening, as between cam, hinge lead wrapping, and pipe, with distributed compression of said lead sheet in substantially the cylindrical shape.

7. In a split cylindrical coupling adapted to be clamped about a pipe, the combination of a sheet of soft lead wrapped around the pipe, and a pair of lead-and-pipe-embracing coupling members having together a hinge joint at one side of the embraced material and having a lip and cam closure at the other side thereof; each said embracing member having a zone, extending longitudinally of the pipe, whereat its thickness of wall is less than elsewhere, for bending of the said members toward conformity with and for distribution of compression over said lead; said hinge comprising, on one said member, a bearing bead along its joint edge, with curved bearing surface which during the swinging on the hinge is substantially tangential to the adjacent lead, and, on the other said member, along its joint edge, a bead-receiving seat with curved bearing wall ending substantially tangential to said lead; said bead and seat cooperating to present toward the interior of the coupling a substantially continuous surface of the coupling at the hinge joint during the swinging on the hinge; and means for holding the bead removable in its said seat.

8. In a split cylindrical coupling having semicylindrical members, a separable hinge joint for the coupling members, comprising a linear bead on the edge of one member, and a linear groove on the other member, said bead and groove fitting together to provide a cylindrical hinge-bearing; a tongue projecting from said bead in radial direction with respect to the axis of the coupling; and a slot in the outer wall of the said groove in which slot said tongue engages, to hold the said bead separably in said groove.

MICHELE MUTO.